(12) United States Patent
Kumagai et al.

(10) Patent No.: US 12,068,005 B2
(45) Date of Patent: Aug. 20, 2024

(54) TAPE REEL AND TAPE CARTRIDGE

(71) Applicant: Sony Group Corporation, Tokyo (JP)

(72) Inventors: Hiroshi Kumagai, Tokyo (JP); Taeko Takahashi, Tokyo (JP); Yuji Iwahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 220 days.

(21) Appl. No.: 17/599,749

(22) PCT Filed: Mar. 3, 2020

(86) PCT No.: PCT/JP2020/008845
§ 371 (c)(1),
(2) Date: Sep. 29, 2021

(87) PCT Pub. No.: WO2020/202980
PCT Pub. Date: Oct. 8, 2020

(65) Prior Publication Data
US 2022/0172743 A1  Jun. 2, 2022

(30) Foreign Application Priority Data

Mar. 29, 2019  (JP) .................. 2019-068263

(51) Int. Cl.
| | |
|---|---|
| G11B 23/04 | (2006.01) |
| B65H 75/14 | (2006.01) |
| G11B 23/037 | (2006.01) |
| G11B 23/107 | (2006.01) |

(52) U.S. Cl.
CPC .......... *G11B 23/044* (2013.01); *B65H 75/14* (2013.01); *G11B 23/037* (2013.01); *G11B 23/107* (2013.01); *B65H 2701/378* (2013.01)

(58) Field of Classification Search
None
See application file for complete search history.

(56) References Cited

U.S. PATENT DOCUMENTS

| | | | | |
|---|---|---|---|---|
| RE26,556 E | * | 3/1969 | Hultgren | G11B 23/037 242/610.4 |
| 3,485,456 A | * | 12/1969 | Tellen | G11B 23/037 242/610.4 |
| 6,257,519 B1 | * | 7/2001 | Willems | G11B 23/037 242/608.6 |
| 6,480,357 B1 | | 11/2002 | Rambosek | |

(Continued)

FOREIGN PATENT DOCUMENTS

| | | |
|---|---|---|
| JP | 2001357659 A | 12/2001 |
| JP | 2006209889 A | 8/2006 |

(Continued)

OTHER PUBLICATIONS

International Search Report mailed Jun. 2, 2020 in connection with PCT/JP2020/008845.

*Primary Examiner* — William A. Rivera
(74) *Attorney, Agent, or Firm* — K&L Gates LLP

(57) ABSTRACT

A tape reel according to an embodiment of the present technology includes: a cylindrical reel hub that includes an outer periphery portion, a tape being wound on the reel hub. The reel hub is formed of a material in which a deformation amount when a load of 300 N is applied radially inward to an axial center of the outer periphery portion is 0.3 mm or less and a water absorption rate is 0.1% or less.

16 Claims, 11 Drawing Sheets

(56) References Cited

U.S. PATENT DOCUMENTS

| | | | | |
|---|---|---|---|---|
| 6,913,219 B2* | 7/2005 | Hiraguchi | ............ | G11B 23/044 |
| | | | | 242/348 |
| 7,300,016 B2* | 11/2007 | Brown | ............. | G11B 23/08728 |
| | | | | 242/348 |
| 7,533,840 B2* | 5/2009 | Sumiya | ................ | G11B 23/107 |
| | | | | 242/348 |
| 7,881,013 B2* | 2/2011 | Ishikawa | ................ | G11B 5/627 |
| | | | | 242/348 |
| 8,177,158 B2* | 5/2012 | Ishikawa | .............. | G11B 23/107 |
| | | | | 242/348 |
| 9,165,586 B2* | 10/2015 | Kawakami | ......... | G11B 5/70678 |
| 9,361,918 B2* | 6/2016 | Noda | ...................... | C09K 21/14 |
| 11,508,407 B2* | 11/2022 | Sekiguchi | ................ | G11B 5/70 |
| 2007/0262188 A1 | 11/2007 | Kubota | | |
| 2008/0265078 A1* | 10/2008 | Shiga | ................... | G11B 23/107 |
| | | | | 242/324 |
| 2013/0284842 A1* | 10/2013 | Moses | .................... | B23P 15/00 |
| | | | | 242/324 |
| 2017/0372726 A1 | 12/2017 | Kasada et al. | | |

FOREIGN PATENT DOCUMENTS

| | | | | |
|---|---|---|---|---|
| JP | 2007305182 | A | | 11/2007 |
| JP | 2008276868 | A | | 11/2008 |
| JP | 2009202567 | | * | 9/2009 |
| JP | 2010020822 | A | | 1/2010 |
| JP | 2017228328 | A | | 12/2017 |
| JP | 7247127 | | * | 3/2023 |

* cited by examiner

TAPE REEL AND TAPE CARTRIDGE

TECHNICAL FIELD

The present technology relates to, for example, a tape reel on which a magnetic tape is wound and a tape cartridge including the tape reel.

BACKGROUND ART

In the past, as a magnetic tape cartridge used as an external recording medium of a computer or the like, those rotatably housing a single tape reel on which a magnetic tape is wound in a cartridge case have been known. The tape reel includes a reel hub on which the magnetic tape is wound, and an upper flange and a lower flange disposed at both ends of the reel hub (see, for example, Patent Literature 1).

CITATION LIST

Patent Literature

Patent Literature 1: Japanese Patent Application Laid-open No. 2007-305182

DISCLOSURE OF INVENTION

Technical Problem

In recent years, the thinning of a magnetic tape and the increase in the tape length have been promoted in accordance with the increase in the recording capacity of a tape cartridge. Meanwhile, the deformation amount of the reel hub due to tightening (winding pressure) of the magnetic tape increases, and thus, there is a possibility that, for example, the width of the tape region located on the inner peripheral side of the tape reel close to reel hub is extended, which adversely affects the recording/reproduction characteristics of the magnetic tape. Further, in the case where the preservation environment of the tape cartridge is high temperature and high humidity, there is a possibility that the width dimension of the magnetic tape wound in the vicinity of the reel hub is partially changed as the reel hub is deformed.

In view of the circumstances as described above, it is an object of the present technology to provide a tape reel capable of suppressing deformation of a reel hub due to tightening of a magnetic tape or the preservation environment, and a tape cartridge including the tape reel.

Solution to Problem

A tape reel according to an embodiment of the present technology includes: a cylindrical reel hub that includes an outer periphery portion, a tape being wound on the reel hub.

The reel hub is formed of a material in which a deformation amount when a load of 300 N is applied radially inward to an axial center of the outer periphery portion is 0.3 mm or less and a water absorption rate is 0.1% or less.

The reel hub may be formed of a material having a flexural modulus of 15 GPa or more.

The reel hub may be a molded body of a composite material in which an inorganic filler is contained in a PPS resin. As a result, a high-strength reel hub having high heat resistance can be formed.

The inorganic filler may be at least one of a glass filler, a mineral filler, or a carbon filler.

The tape reel may further include: a first flange bonded to one axial end of the reel hub; and a second flange integrally molded in the other axial end of the reel hub.

The reel hub may be formed of stainless steel.

A tape reel according to another embodiment of the present technology includes: a first flange; a second flange; and a cylindrical reel hub.

The reel hub is disposed between the first flange and the second flange and has an elastic modulus higher than those of the first flange and the second flange.

As a result, deformation of the reel hub due to tightening of the tape can be suppressed.

The first flange may include a plurality of first engagement portions provided inside the reel hub, and the second flange may include a plurality of second engagement portions that is disposed inside the reel hub and engages with the plurality of first engagement portions. The reel hub is sandwiched between the first flange and the second flange coupled to each other via the plurality of first engagement portions and the plurality of second engagement portions.

The first flange may further include a plurality of first protrusions that fits into one axial end surface of the reel hub.

As a result, the reel hub can be positioned relative to the first flange to prevent the reel hub from relatively rotating relative to the first flange.

The second flange may further include a plurality of second protrusions that fits into the other axial end surface of the reel hub.

A tape cartridge according to an embodiment of the present technology includes: a tape reel including a cylindrical reel hub that includes an outer periphery portion, a tape being wound on the reel hub.

The reel hub is formed of a material in which a deformation amount when a load of 300 N is applied radially inward to an axial center of the outer periphery portion is 0.3 mm or less and a water absorption rate is 0.1% or less.

A tape cartridge according to another embodiment of the present technology includes: a tape reel that includes a first flange, a second flange, and a cylindrical reel hub that is disposed between the first flange and the second flange and has an elastic modulus higher than those of the first flange and the second flange, a tape being wound on the reel hub.

Advantageous Effects of Invention

In accordance with the present technology, deformation of a reel hub can be suppressed.

Note that the effects described herein are not necessarily limitative, and any of the effects described in the present disclosure may be provided.

MODE(S) FOR CARRYING OUT THE INVENTION

Hereinafter, an embodiment according to the present technology will be described with reference to the drawings.

First Embodiment

Figure 1:
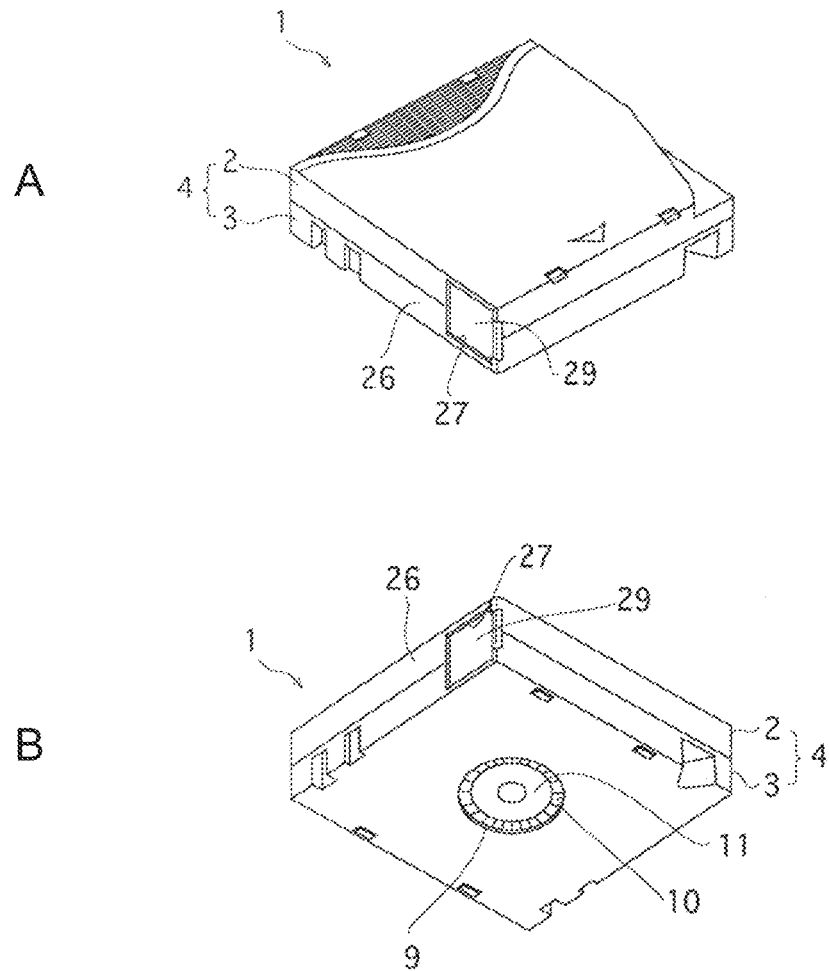
FIG. 1 is an entire perspective view of a tape cartridge according to a first embodiment of the present technology, Part A being a perspective view of the tape cartridge as viewed from the upper surface (upper shell) side, Part B being a perspective view of the tape cartridge as viewed from the lower surface (lower shell) side.
Figure 2:
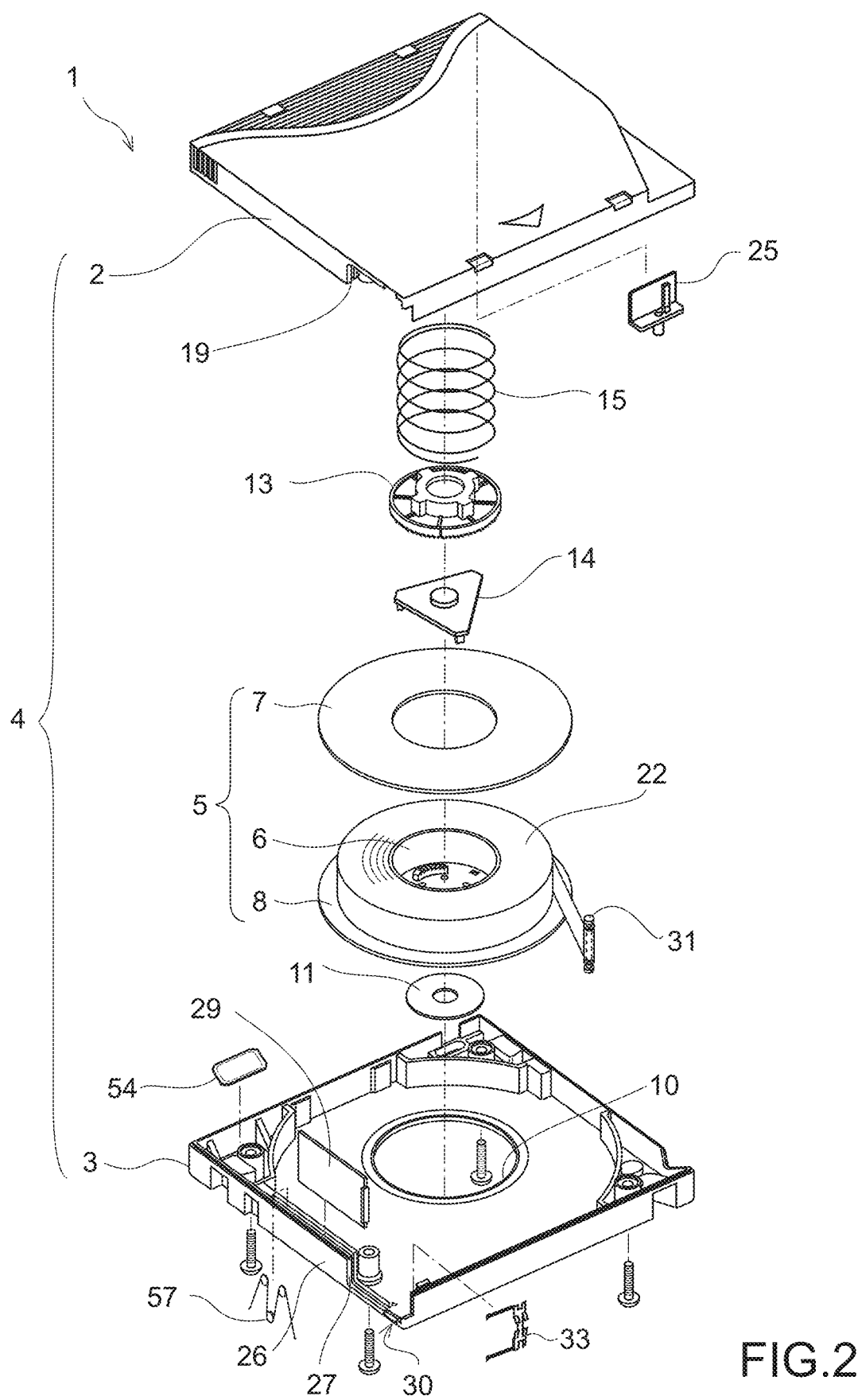
FIG. 2 is an exploded perspective view of the tape cartridge.
Figure 3:
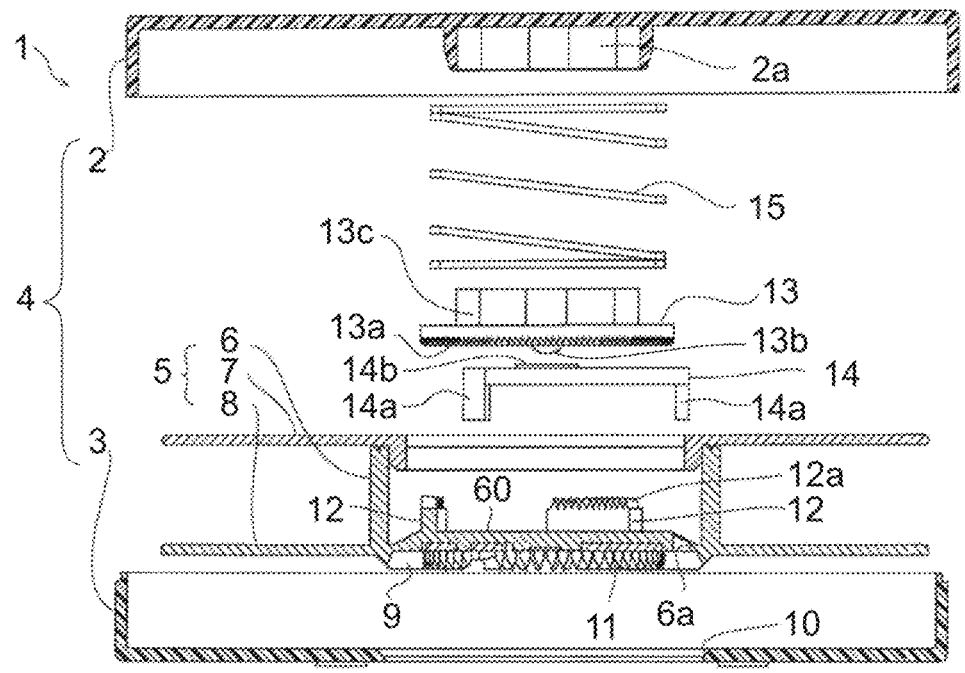
FIG. 3 is an exploded cross-sectional side view of the tape cartridge.

FIG. 1 is an entire perspective view of a tape cartridge 1 according to a first embodiment of the present technology, Part A being a perspective view of the tape cartridge 1 as viewed from the upper surface (upper shell 2) side, Part B being a perspective view of the tape cartridge 1 as viewed from the lower surface (lower shell 3) side. FIG. 2 is an exploded perspective view of the tape cartridge 1, and FIG. 3 is an exploded cross-sectional side view thereof.

[Overall Configuration]

The tape cartridge 1 according to this embodiment is configured as a magnetic tape cartridge conforming to the LTO (Linear Tape Open) standard. The tape cartridge 1 has a configuration in which a single tape reel 5 on which a magnetic tape 22 is wound is rotatably housed inside a cartridge case 4 formed by connecting the upper shell 2 and the lower shell 3 to each other with a plurality of screw members 43.

The tape reel 5 includes a reel hub 6 having a bottomed cylindrical shape, an upper flange 7 joined to an upper end (opening end) of the reel hub 6, and a lower flange 8 integrally formed at the lower end of the reel hub 6, which are each formed of an injection molded body of a synthetic resin material.

A chucking gear 9 that engages with a reel rotation drive shaft of a tape drive device is annularly formed in the center of the lower surface of the tape reel 5, and is exposed to the outside via an opening 10 provided in the center of the lower shell 3 as shown in Part B of FIG. 1. On the inner peripheral side of this chucking gear 9, an annular metal plate 11 magnetically attracted to the above-mentioned reel rotation drive shaft is fixed to the bottom outer surface of the reel hub 6 by insert-molding.

A reel locking mechanism for preventing the tape reel 5 from rotating when the tape cartridge 1 is not in use is provided inside the reel hub 6. As shown in FIG. 3, the reel locking mechanism includes a plurality of gear forming walls 12 erected on the upper surface of a bottom portion 60 of the reel hub 6, a reel lock member 13 including engagement teeth 13a that engage with a gear portion 12a formed on the upper surface of the gear forming wall 12, a reel lock release member 14 for releasing the engagement between the gear forming wall 12 and the reel lock member 13, and a reel spring 15 provided between the inner surface of the upper shell 2 and the upper surface of the reel lock member 13. The reel spring 15 is a coil spring, and biases the tape reel 5 toward the lower shell 3 via the reel lock member 13.

The gear forming wall 12 has an arc shape, and three gear forming walls 12 are formed on the upper surface of the bottom portion 60 of the reel hub 6 at equal intervals on the same circumference around the axial center of the reel hub 6. The engagement teeth 13a of the reel lock member 13 facing the gear portion 12a of the gear forming wall 12 are annularly formed on the lower surface of the reel lock member 13, and constantly urged in the direction of engaging with the gear portion 12a under the reel spring 15. A fitting projecting portion 13c is formed on the upper surface of the reel lock member 13, and a fitting recessed portion 2a that fits into this fitting projecting portion 13c is formed substantially at the center of inner surface of the upper shell 2.

The reel lock release member 14 has a substantially triangular shape and is disposed between the bottom portion 60 of the reel hub 6 and the reel lock member 13. On the lower surface of the reel lock release member 14, a total of three legs 14a are formed to project downward from the vicinity of the apexes of the substantially triangular shape. These legs are positioned between the gears of the chucking gear 9 via an insertion hole 6a formed in the bottom portion 60 of the reel hub 6 when the cartridge is not in use.

Each of the legs 14a of the reel lock release member 14 is pressed upward by the reel rotation drive shaft of a tape drive device, which engages with the chucking gear 9, when the cartridge is in use, and causes the reel lock member 13 to move to the unlocked position against the biasing force of the reel spring 15. Further, the legs 14a are configured to be rotatable with respect to the reel lock member 13 together with the tape reel 5. A support surface 14b for supporting a sliding contact portion 13b having a circular arc shape in cross section, which is formed to project at a substantially central portion of the lower surface of the reel lock member 13 is provided at a substantially central portion of the upper surface of the reel lock release member 14.

An outlet 27 for pulling out one end of the magnetic tape 22 to the outside is provided to a side wall 26 of the cartridge case 4. A slide door 29 that opens and closes the outlet 27 is disposed on the inner side of the side wall 26. The slide door 29 is configured to slide in the direction of opening the outlet 27 against the urging force of a torsion spring 57 by engaging with a tape loading mechanism (illustration omitted) of the tape drive device.

A leader pin 31 is fixed to one end of the magnetic tape 22. The leader pin 31 is configured to be attachable/detachable to/from a pin holding portion 33 provided on the inner side of the outlet 27. The pin holding portion 33 is attached to the inner surface of the upper shell 2 and the inner surface of the lower shell 3, and is configured to be capable of elastically holding the upper end and the lower end of the leader pin 31.

In addition to a safety tab 25 for preventing erroneous erasure of information recorded on the magnetic tape 22, a cartridge memory 54 capable of reading and writing the content relating to information recorded on the magnetic tape 22 in a non-contact manner is disposed inside the cartridge case 4. The cartridge memory 54 includes a non-contact communication medium in which an antenna coil, an IC chip, and the like are mounted on a substrate.

[Tape Reel]

Subsequently, details of the tape reel 5 will be described.

As described above, the tape reel 5 includes the reel hub 6, the upper flange 7 as a first flange and the lower flange 8 as a second flange, and the reel hub 6 is integrally formed with the lower flange 8 in this embodiment. The reel hub 6 has a cylindrical shape. The outer diameter of the reel hub 6 is 44 mm, and the axial height thereof is a slightly larger height (12.87 mm) than the width of the magnetic tape 22 (12.65 mm).

Figure 4:
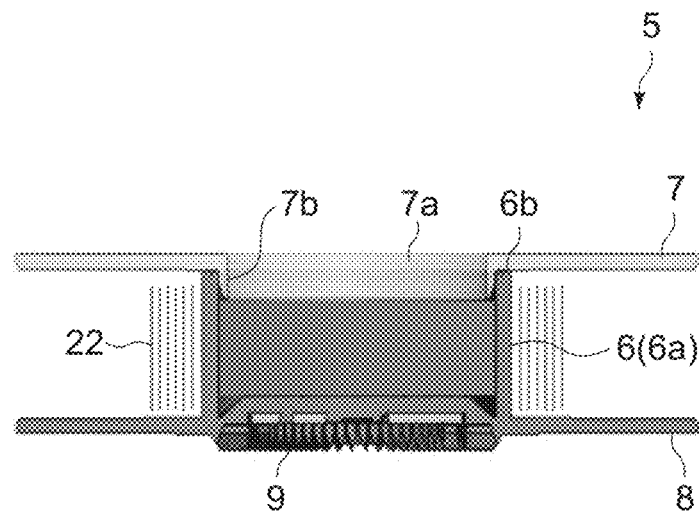
FIG. 4 is a schematic cross-sectional side view of a tape reel in the above-mentioned tape cartridge.

FIG. 4 is a schematic cross-sectional side view of the tape reel 5. An outer periphery portion 6a of the reel hub 6 is typically formed with a flat cylindrical surface. The upper flange 7 is positioned by fitting an annular projecting portion 7b formed along the periphery of a centrally located opening 7a into the reel hub 6. The reel hub 6 is ultrasonically bonded to the upper flange 7 just above an upper end portion 6b.

Figure 5:
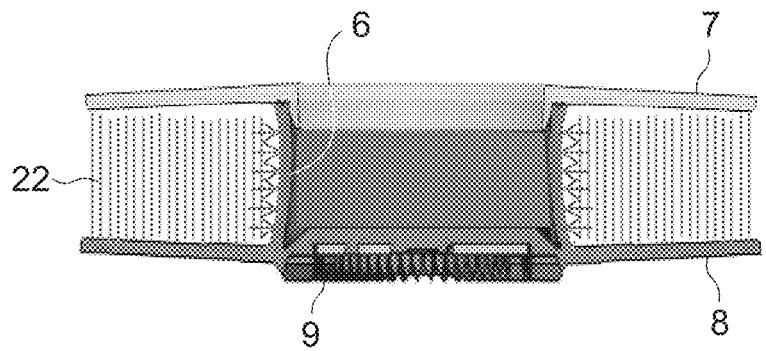
FIG. 5 is a schematic diagram showing an exaggerated state of deformation of the above-mentioned tape reel.

The reel hub 6 functions as a winding core on which the magnetic tape 22 is wound. At this time, the outer periphery portion 6a of the reel hub 6 is pressed radially inward by the tightening of the magnetic tape 22 (winding pressure). In recent years, the thinning of the magnetic tape 22 and the increase in the tape length have been promoted in accordance with the increase in the recording capacity of the tape cartridge. Meanwhile, the tightening of the magnetic tape deforms the reel hub 6 radially inward, and the amount of deformation increases to the extent that the reel hub 6 is curved in a direction of projecting radially inward in some cases as shown exaggerated in FIG. 5. In this case, since stress in the tape width direction acts also on the magnetic tape 22, changes in the width dimension of the magnetic tape 22 are problematic. Further, in the case where the preservation environment of the tape cartridge is high temperature and high humidity, there is a possibility that the width dimension of the magnetic tape wound in the vicinity of the reel hub is partially changed as the reel hub is deformed.

Figure 6:
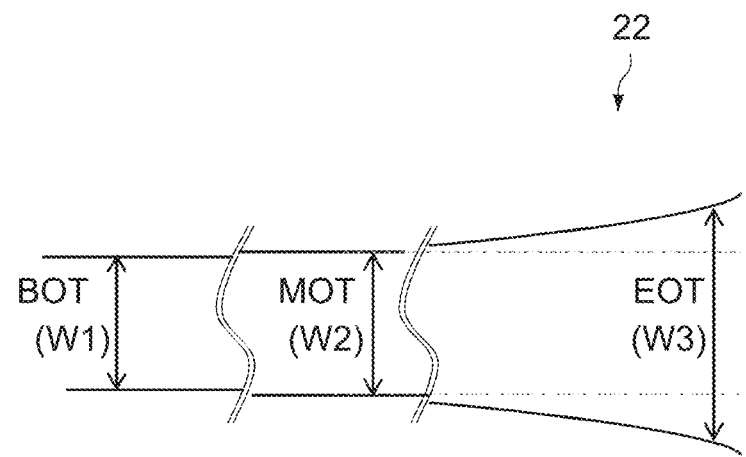
FIG. 6 is a schematic diagram describing a change in the width dimension of a magnetic tape due to deformation of a reel hub.

FIG. 6 is a schematic diagram describing a change in the width dimension of the magnetic tape due to deformation of the reel hub. As shown in FIG. 6, the width dimension of the magnetic tape wound around the tape reel in which deformation has occurred in the reel hub differs in the respective regions of BOT (Begin of Tape), MOT (Middle of Tape), and EOT (End of Tape). The BOT refers to the region on the outer peripheral side near the end of the tape to which a leader pin is attached, the EOT refers to the region on the inner peripheral side near the reel hub, and the MOT refers to the region between the EOT and BOT. In the case where the average values of the tape widths of the BOT, MOT, and EOT regions are defined as W1, W2, and W3, respectively, since the fluctuation amount (widening amount) of the tape width dimension on the inner peripheral side, which is likely to be affected by deformation of the reel hub, is larger, typically, the size of the tape width in the respective regions satisfies the relationship of W1<W2<W3. Then, when the widening amount of the magnetic tape becomes too large, there is a possibility that the recording/reproduction characteristics of the magnetic tape is adversely affected.

Figure 7:
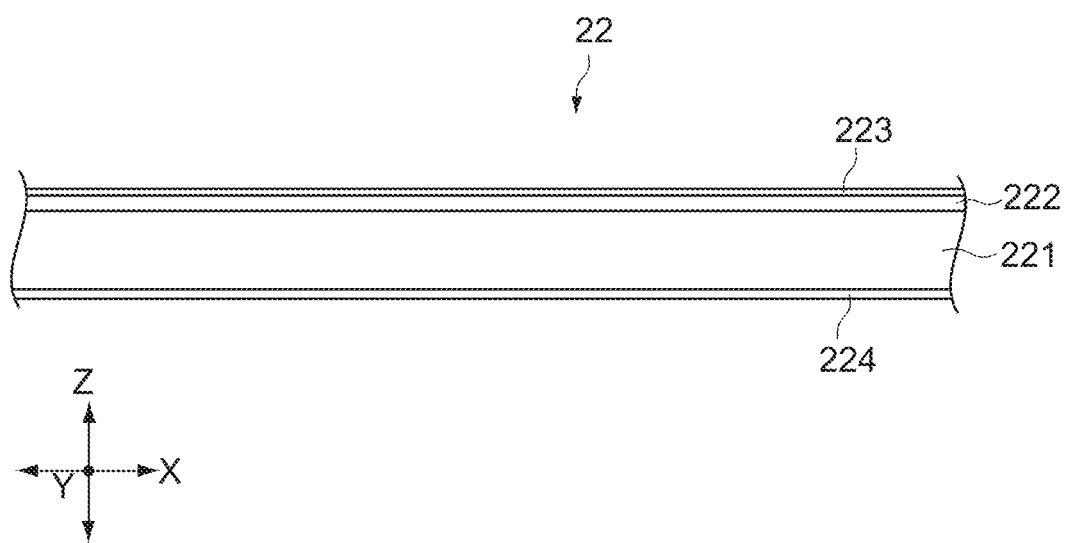
FIG. 7 is a cross-sectional view showing a configuration example of the magnetic tape.

Here, as shown in FIG. 7, the magnetic tape 22 includes a tape-shaped base material 221 long in the longitudinal direction (X-axis direction), a non-magnetic layer 222 provided on one main surface of the base material 221, a magnetic layer 223 provided on the non-magnetic layer 222, and a back layer 224 provided on the other main surface of the base material 221. Details of the magnetic tape 22 will be described below. Note that the back layer 224 only needs to be provided as necessary, and may be omitted.

Figure 8:
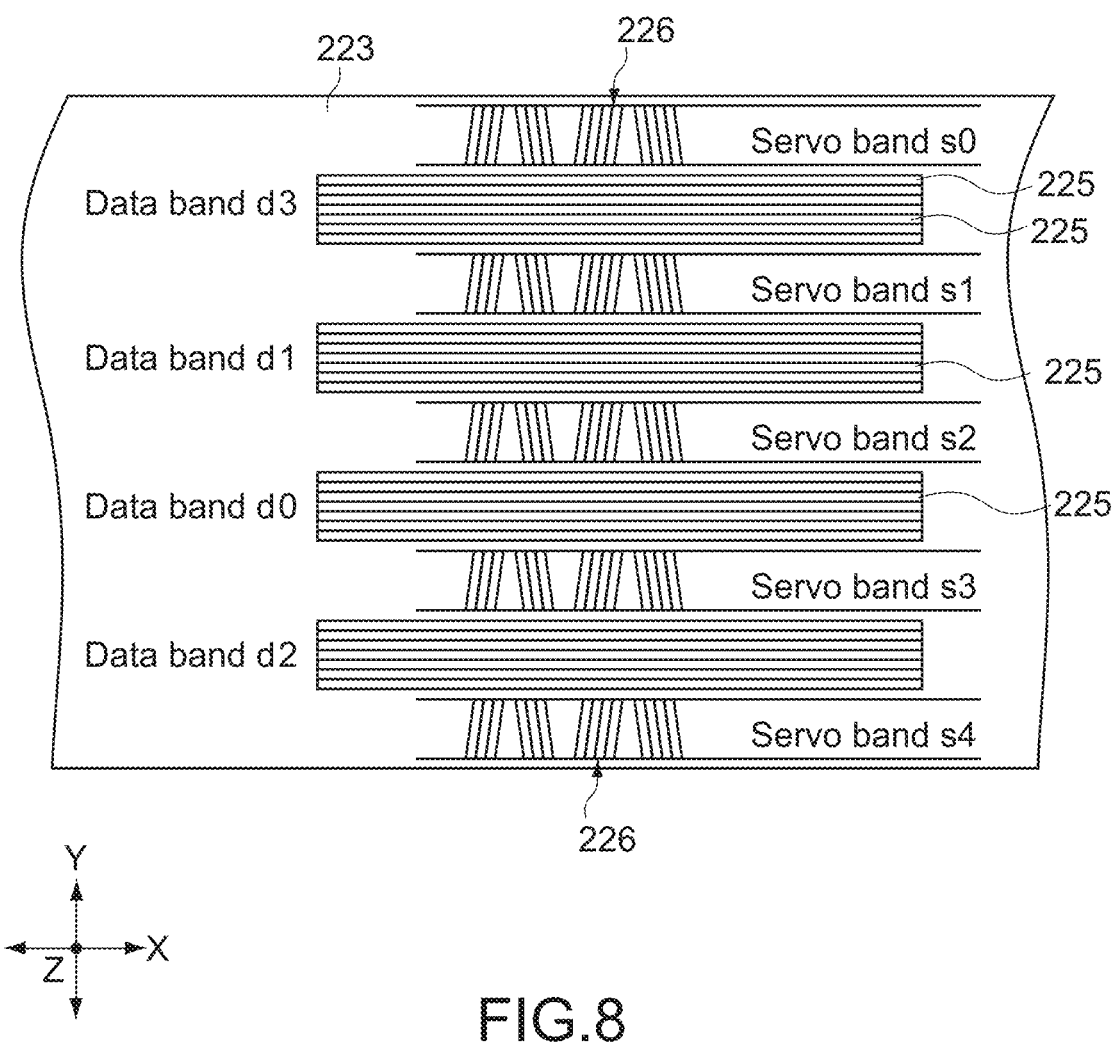
FIG. 8 is a schematic plan view describing a recording layer of the magnetic tape.

FIG. 8 is a schematic diagram of the magnetic tape 22 as viewed from above. Referring to FIG. 8, the magnetic layer 223 includes a plurality of data bands d (data bands d0 to d3) that is long in the longitudinal direction (X-axis direction), a data signal being written to the plurality of data bands d, and a plurality of servo bands s (servo bands s0 to s4) long in the longitudinal direction, a servo signal being written to the plurality of servo bands s. The servo bands s are located at positions where the respective data bands d are sandwiched in the width direction (Y axis direction). Since the servo bands s are located at positions where the respective data bands d are sandwiched, the number of servo bands s is one more than the number of data bands d. In the example shown in FIG. 8, a case where the number of data bands d is four and the number of servo bands s is five is shown. Note that the number of data bands d and the number of servo bands s can be changed as appropriately.

The data band d includes a plurality of recording tracks 225 that is long in the longitudinal direction and aligned in the width direction. A data signal is recorded along this recording track 225 in the recording track 225. The servo band s includes a servo signal recording pattern 226 of a predetermined pattern, a servo signal being recorded on the servo signal recording pattern 226 by a servo signal recording device (not shown).

In the magnetic tape 22 configured as described above, since data bands on which data signals are recorded are aligned on the tape width direction, there is a possibility that the expansion of the tape width causes the distance between adjacent data bands d to fluctuate and stable recording/reproduction cannot be performed.

In this regard, in this embodiment, in order to suppress deformation of the reel hub 6 due to tightening of the magnetic tape 22, the reel hub 6 is formed of a material having predetermined strength and water absorption rate. Note that since the lower flange 8 is integrally formed with the reel hub 6, the lower flange 8 is also formed of the same materials as that of the reel hub 6.

The reel hub 6 in the tape reel 5 in this embodiment is formed of a high-rigidity material with a low deformation amount and a low water absorption rate. More specifically, the high-rigidity material forming the reel hub 6 favorably has a deformation amount of 0.3 mm or less when a load of 300N is applied radially inward to the axial center of the outer periphery portion 6a of the reel hub 6 and a water absorption rate of 0.1% or less. As a result, it is possible to suppress deformation of the reel hub 6 due to tightening of the magnetic tape 22 and the preservation environment of high temperature and high humidity.

As such a high-rigidity material, a material having a flexural modulus of 15 GPa or more is suitable. The flexural modulus typically refers to the flexural modulus measured by a test method conforming to JIS K7171 (ISO-178 similarly) or ASTM-D790. Examples of the high-rigidity material having a flexural modulus of 15 GPa or more include a composite plastic material in which an inorganic filler is contained in a synthetic resin material, and an iron-based metal material such as stainless steel. In this embodiment, since the reel hub 6 is integrally molded with the lower flange 8, the above-mentioned composite plastic material is used as the high-rigidity material.

The water absorption rate refers to the water absorption rate measured by a test method conforming to JIS K7209.

Examples of the resin material having a low water absorption rate include a phenol resin, PEEK (polyether ether ketone), POM (polyacetal), PET (polyethylene terephthalate), an acrylic resin, PC (polycarbonate), PP (polypropylene), and PPS (polyphenylene sulfide). Containing of the filler allows the flexural modulus to be adjusted to a desired value. Among them, PPS having high moldability and heat resistance and a low water absorption rate is suitable for the resin material to be a matrix resin of the above-mentioned composite plastic material.

As the inorganic filler, a glass filler (GF), a mineral filler (MF), a carbon filler (CF), a metal whisker (W), or the like can be used without any particular limitation. The content is not particularly limited, and is, for example, 30 wt % or more and 65 wt % or less.

EXAMPLE

Next, examples of experiments conducted by the present inventors will be described.

Example 1

Using a composite resin material (flexural modulus 20 GPa) containing 65 wt % of an inorganic filler (glass filler and mineral filler) in PPS, a lower flange integrated reel hub (hereinafter, referred to also as reel half) was prepared by an injection molding method. The outer diameter of the lower flange was 97 mm±0.1 mm, and the outer diameter, inner diameter, and height of the reel hub were respectively 44 mm±0.1 mm, 39.6 mm±0.1 mm, and 12.87 mm±0.1 mm.

<<Hub-Rigidity Evaluation>>

Subsequently, the reel hub of the prepared reel half was subjected to a compressive test to evaluate the rigidity. A compression tester "RTG-1210" manufactured by A & D Co., Ltd. was used as the compression tester.

Figure 9:
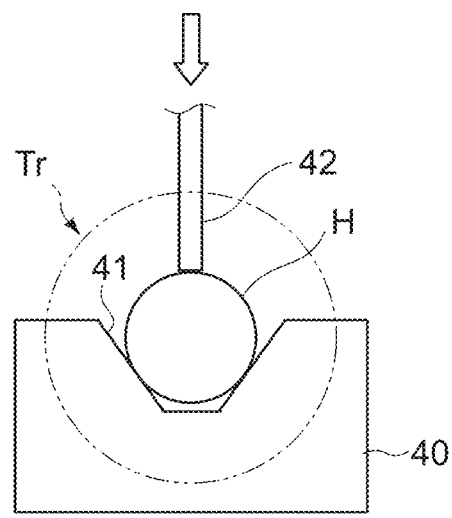
FIG. 9 is a schematic diagram describing test method of the tape reel.

As shown in FIG. 9, a cylindrical probe 42 having a diameter of 10 mm was attached to the load cell (1 kN) of the tester, and a jig 40 including a flat receiving portion 41 was installed on the pedestal of the tester. While the lower outer peripheral surface of a reel hub H of a reel half Tr was supported by the receiving portion 41, the distal end portion of the probe 42 was caused to be contact with the upper end outer peripheral surface of the reel hub H, and the amount of deformation radially inward of the outer periphery portion was measured by applying a load of predetermined magnitude to the reel hub H radially inward (vertically downward).

The test velocity was 2 mm/min, and the sampling interval was 5 μm. Measurement was carried out until the load reached 500 N, and the amount of deformation at 300 N was used as a measurement value.

<<Measurement of Water Absorption Rate>>

Figure 10:
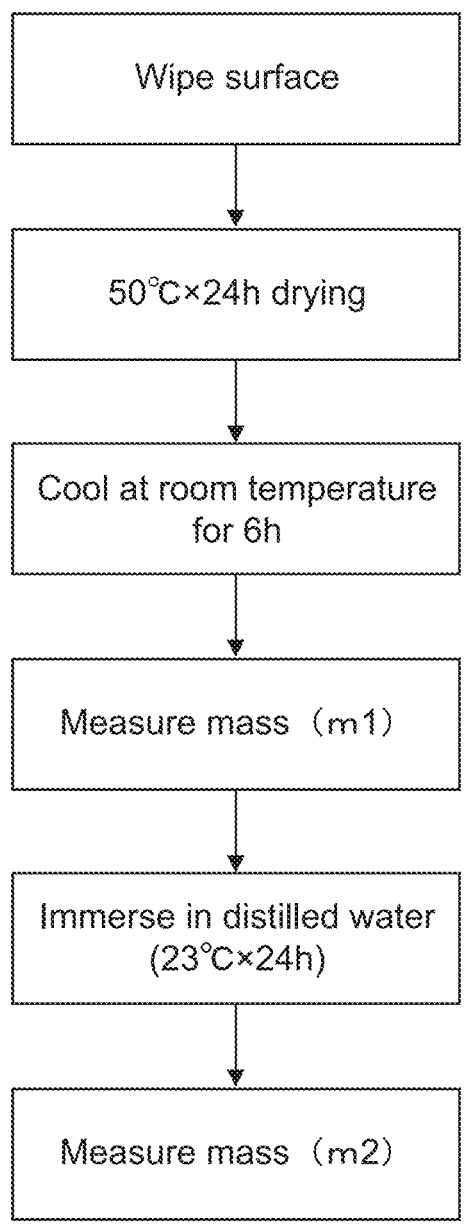
FIG. 10 is a flowchart showing a procedure of measuring the water absorption rate of the tape reel.

Subsequently, the water absorption rate of the prepared reel half was measured. Measurement was carried out by the following method conforming to a JIS K7209 (ISO62) A method. FIG. 10 shows the measurement procedure. Note that the reel half in which the metal plate 11 (see FIG. 3) was not insert molded on the bottom of the reel hub (or removed) was used for measuring the water absorption rate.

The surface of the prepared reel half was wiped and dried in an oven at 50° C. for 24 hours. Subsequently, the reel half was replaced from the oven into a desiccator and cooled at room temperature for 6 hours. Next, the mass of the reel half taken out of the desiccator was measured, and the value was defined as m1. Subsequently, the reel half was immersed in distilled water at 23° C. for 24 hours. Then, the surface of the reel half taken out of the distilled water was wiped, the mass thereof was measured again within 1 minute, and the value thereof was defined as m2. Note that m2 was an average value of three samples, and measurement of m2 was repeated until differences in values between these samples were ±0.1 g or less.

A water absorption amount C (mass percentage of absorbed water) of the reel half was calculated from the following calculation formula on the basis of the obtained values of m1 and m2, and the value was used as the water absorption rate.

$$C=\{(m2-m1)/m1\}\times 100$$

<<Measurement of Tape-Width Change>>

A tape reel was prepared by bonding an upper flange to the prepared reel half by the ultrasonic bonding method. In this tape reel, a magnetic tape shown in FIG. 7 having a width of 12.65 mm, an overall length of 960 m, and a total thickness of 5.6 μm was wrapped around a reel hub with a tension of 0.64 N to prepare a tape-wound body. Before and after the obtained tape-wound body was preserved in an environment of temperature of 49° C. and humidity of 80% for one week, the deviation amount of the track position of the tape in each region of the BOT, MOT, and EOT was measured by the LTO drive.

Here, the tape lengths of the BOT, MOT and EOT regions were respectively in the range of 25 m to 85 m, 425 m to 485 m, and 885 m to 945 m when the tape tip was defined as 0 [m]. The deviation amount of the track position was calculated from the difference between each data band size measured from the tracking control amount during reproduction of the data signals recorded on the data bands d0 and d3 (see FIG. 8) and the Nominal value (LTO7) thereof, and the value obtained by measuring this for each of the BOT, MOT, and EOT regions was used as the tape width change amount.

Example 2

A reel half were prepared under the same condition as that in Example 1 except that a composite resin material (flexural modulus 31 GPa) containing 30 wt % of a carbon filler in PPS was used as a composite plastic material forming the reel half. The prepared reel half was subjected to a compressive test and water absorption rate measurement were performed under the same condition as that in Example 1. Further, a magnetic tape was wrapped around a tape reel including the reel half, and the tape width change amount was measured for the BOT, MOT, and EOT regions under the same condition as that in Example 1.

Comparative Example 1

A reel half was prepared under the same condition as that in Example 1 except that PC (flexural modulus 2.3 GPa) containing no inorganic filler was used as the composite plastic material forming the reel half. The prepared reel half was subjected to a compressive test and water absorption rate measurement under the same condition as that in Example 1. Further, a magnetic tape was wrapped around a tape reel including the reel halves, and the tape width change amount was measured for the BOT, MOT, and EOT regions under the same condition as that in Example 1.

Comparative Example 2

A reel half was prepared under the same condition as that in Example 1 except that a composite resin material (flexural modulus 15 GPa) containing 15 wt % of a glass filler in PC was used as the composite plastic material forming the reel half. The prepared reel half was subjected to a compressive test and water absorption rate measurement under the same condition as that in Example 1. Further, a magnetic tape was wrapped around a tape reel including the reel halves, and the tape width change amount was measured for the BOT, MOT, and EOT regions under the same condition as that in Example 1.

Comparative Example 3

A reel half was prepared under the same condition as that in Example 1 except that a composite resin material (flexural modulus 40 GPa) containing 60 wt % of an inorganic filler (metal whisker and carbon filler) in PA (polyamide) was used as the composite plastic material forming the reel half. The prepared reel half was subjected to a compressive test and water absorption rate measurement under the same condition as that in Example 1. Further, a magnetic tape was wrapped around a tape reel including the reel halves, and the tape width change amount was measured for the BOT, MOT, and EOT regions under the same condition as that in Example 1.

The constituent materials of the reel halves in each of Examples 1 and 2, and Comparative Examples 1 to 3, the flexural modulus thereof, and the results of evaluating the hub-rigidity, the water absorption rate, and the tape width change are shown in Tables 1 and 2. In Table 2, "+" of the tape width change indicates an increase in the width, and "−" indicates a decrease in the width.

TABLE 1

|  | Material | Content of filler (%) | Flexural modulus (GPa) | Hub-rigidity (mm) | Water absorption rate (%) |
| --- | --- | --- | --- | --- | --- |
| Example 1 | PPS + GF/MF | 65 | 20 | 0.165 | 0.02 |
| Example 2 | PPS + CF | 30 | 31 | 0.225 | 0.02 |
| Comparative Example 1 | PC | — | 2.3 | 1.380 | 0.14 |
| Comparative Example 2 | PC + GF | 15 | 4 | 0.380 | 0.06 |
| Comparative Example 3 | PA + W/CF | 60 | 40 | 0.170 | 1.43 |

TABLE 2

|  | Tape width change | | |
| --- | --- | --- | --- |
|  | BOT (μm) | MOT (μm) | EOT (μm) |
| Example 1 | −2.7 | 1.0 | 5.5 |
| Example 2 | −1.3 | 2.4 | 6.3 |
| Comparative Example 1 | −1.5 | 2.3 | 6.8 |
| Comparative Example 2 | −2.4 | 1.6 | 7.3 |
| Comparative Example 3 | −2.2 | 1.4 | 7.5 |

As shown in Table 2, in accordance with Examples 1 and 2 in which the deformation amount when a load of 300 N is applied radially inward to the axial center of the outer periphery portion of the reel hub is 0.3 mm or less and the water absorption rate is 0.1% or less, the obtained results have shown that the tape width change, particularly, the change amount of the tape width in the EOT region in the vicinity of the reel hub is smaller than that in Comparative Examples 1 to 3. This is presumably because the hub-rigidity is high because the flexural modulus of the material itself forming the reel hub is 20 GPa or more, and thus deformation of the reel hub against tightening (winding pressure) of the magnetic tape is suppressed. Further, another reason is that since the water absorption rate of the material is extremely low, i.e., 0.02%, there is little deformation of the reel hub even after long-term preservation in a high-humidity environment and the shape-stability is extremely high.

Note that the reason why the width fluctuation amount of the EOT is relatively high in Example 2 is presumably because the moldability of the material forming the reel hub is slightly inferior to that in Example 1. For this reason, it is presumed that the tape-width fluctuation amount can be improved to a level equivalent to that in Example 1 by increasing the formability by, for example, limiting the content of the filler.

Meanwhile, in accordance with Comparative Example 1, since the hub-rigidity is low because the flexural modulus of the material is as low as 2.3 GPa, and the water absorption rate is relatively high, i.e., 0.14%, the tape width fluctuation caused by deformation of the reel hub due to tightening of the magnetic tape and long-term preservation in a high humidity environment was large as compared with Examples 1 and 2. Regarding Comparative Example 2, despite the relatively low water absorption rate of 0.06%, the hub-rigidity was low because the flexural modulus of the reel hub was low, i.e., 4 GPa, and the fluctuation amount of the tape width in the EOT region was remarkably large. On the contrary, regarding Comparative Example 3, although the hub-rigidity was relatively high, the tape width fluctuation caused by long-term preservation in a high humidity environment was large because the water absorption rate was high, i.e., 1.43%.

Second Embodiment

Figure 11:
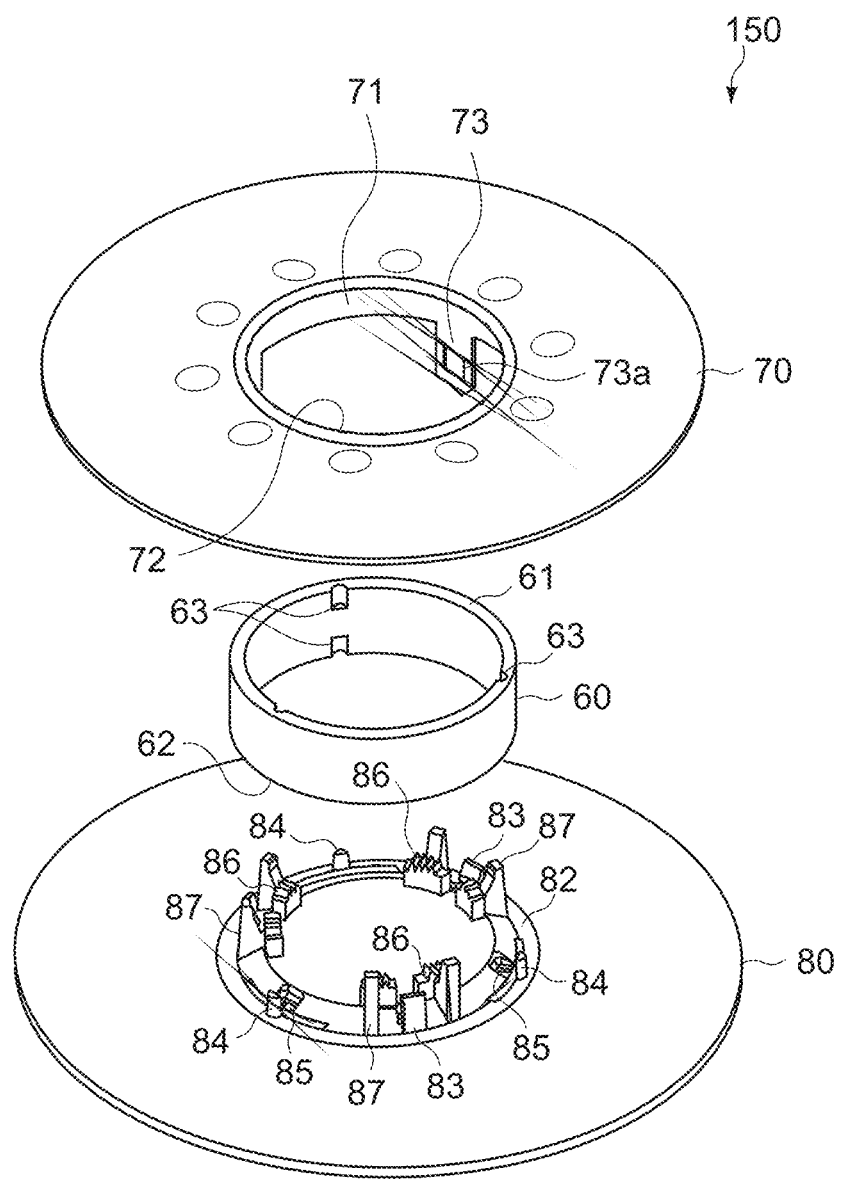
FIG. 11 is an exploded perspective view showing a configuration of a tape reel according to a second embodiment of the present technology.

Next, a second embodiment of the present technology will be described. FIG. 11 is an exploded perspective view showing a configuration of a tape reel according to this embodiment.

A tape reel 150 according to this embodiment is different from that in the first embodiment in that it includes a reel hub 60, an upper flange 70 (first flange), and a lower flange 80 (second flange) and the reel hub 60 is formed of a member different from that of the lower flange 80.

Figure 12:
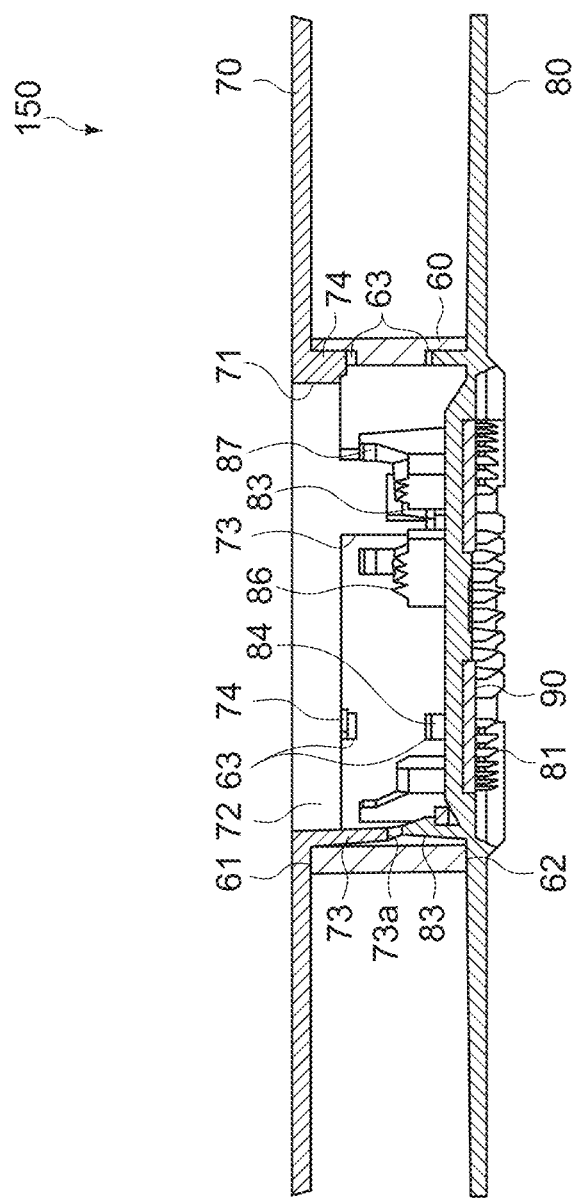
FIG. 12 is a cross-sectional side view of the above-mentioned tape reel.
Figure 13:
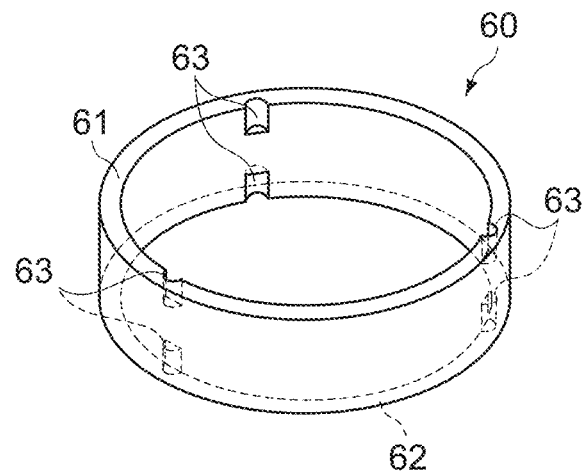
FIG. 13 is an entire perspective view of the reel hub in the above-mentioned tape reel.
Figure 14:
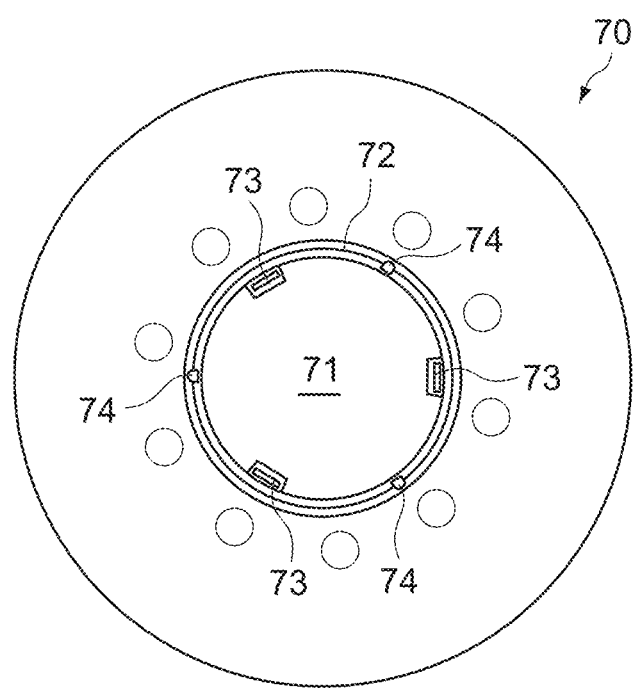
FIG. 14 is a bottom view of an upper flange in the above-mentioned tape reel.
Figure 15:
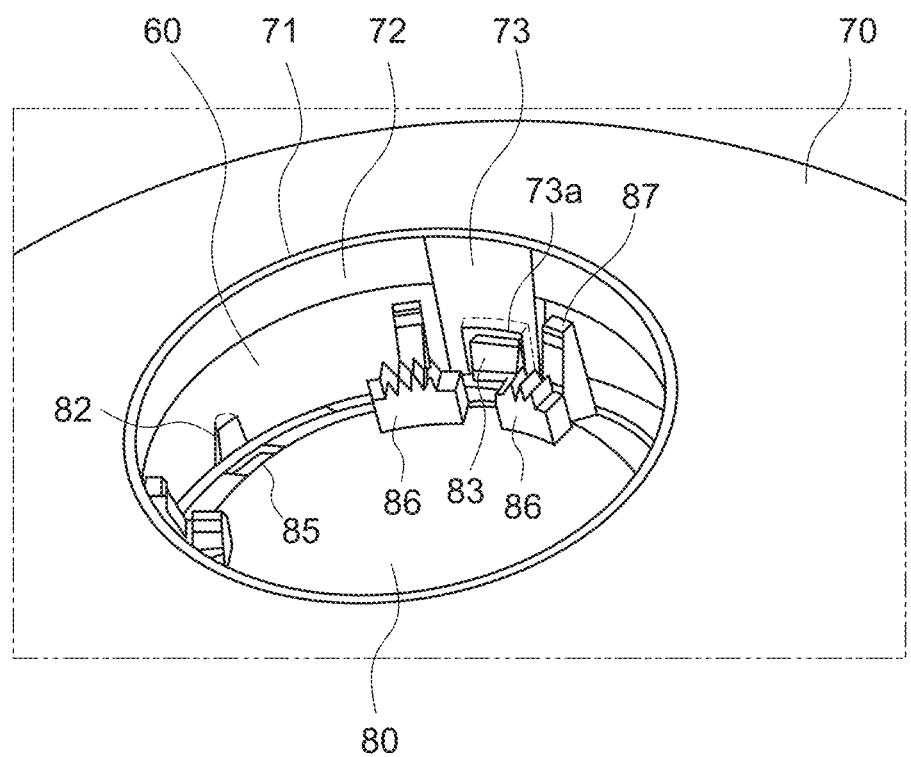
FIG. 15 is a perspective view showing a coupling portion between the upper flange and a lower flange in the above-mentioned tape reel.

FIG. 12 is a cross-sectional side view of the tape reel 150, FIG. 13 is an entire perspective view of the reel hub 60, FIG. 14 is a bottom view of the upper flange 70, and FIG. 15 is a perspective view showing a coupling portion between the upper flange 70 and the lower flange 80. Hereinafter, details of the respective portions will be described.

The reel hub 60 functions as a winding core of a magnetic tape and is disposed between the upper flange 70 and the lower flange 80. The reel hub 60 has a cylindrical shape and is formed of a material having an elastic modulus higher than those of the upper flange 70 and the lower flange 80. The reel hub 60 is typically formed of a metal material such as stainless steel, a synthetic resin material, or a composite plastic material in which a filler is contained in a synthetic resin material.

The reel hub 60 is favorably formed of a material having a flexural modulus of 15 GPa or more. It is more favorable that the reel hub 60 is formed of a high-rigidity material in which a deformation amount of 0.3 mm or less when a load of 300 N is applied radially inward to the axial center of the outer periphery portion and a water absorption rate is 0.1% or less, similarly to the first embodiment. As a result, deformation due to winding tightening (winding pressure) of the magnetic tape and long-term preservation in a high humidity environment can be effectively prevented.

The reel hub 60 has a first end surface 61 facing the upper flange 70 and a second end surface 62 facing the lower flange 80. The first end surface 61 and the second end surface 62 are typically flat surfaces, and each inner peripheral edge is provided with a plurality of engagement recessed portions 63 at equal angular intervals. Three engagement recessed portions 63 are provided at 120 degree intervals in this embodiment. The engagement recessed portion 63 provided on the first end surface 61 and the engagement recessed portion 63 provided on the second end surface 62 are disposed axially opposite to each other at the same angular position. The number of engagement recessed portions 63 is not particularly limited, and may be 2 or 4 or more.

The upper flange 70 has a disk shape, and includes an injection molded body formed of a synthetic resin material such as PC and ABS, and is typically formed of a material having transparency. The upper flange 70 includes a circular opening 71 at the center and is provided with an annular projecting portion 72 depending from the peripheral edge of the opening 71 toward the reel hub 60. The outer diameter of the annular projecting portion 72 is slightly smaller than the inner diameter of the reel hub 60. By fitting the annular projecting portion 72 into the first end surface 61 of the reel hub 60, the center of the upper flange 70 is positioned at the axial center of the reel hub 60, and the first end surface 61 faces the lower surface of the upper flange 70 on the outer peripheral side of the annular projecting portion 72 (see FIG. 12).

The upper flange 70 includes a plurality of first protrusions 74 (see FIG. 14) that engages with the plurality of engagement recessed portions 63 provided on the first end surface 61 of the reel hub 60. The first protrusion 74 is provided on the outer peripheral side of the annular projecting portion 72 and restricts relative rotation of the upper flange 70 around the axis relative to the reel hub 60 by the engagement action with the engagement recessed portion 63 of the first end surface 61 (see FIG. 12).

The upper flange 70 further includes a plurality of first engagement portions 73 that engages with the lower flange 80 (see FIG. 14). The first engagement portion 73 is a tongue-like plate piece that is provided inside the reel hub 60 and extends partially from the annular projecting portion 72 toward the inside of the reel hub 60. In this embodiment, three first engagement portions 73 are provided at equal angular intervals. The first engagement portion 73 is provided at an angular position different from that of the first protrusion 74. However, the present technology is not limited thereto, and the first engagement portion 73 may be provided at the same angular position as that of the first protrusion 74. The number of the first engagement portions 73 is also not limited to 3, and may be 2 or 4 or more.

The lower flange 80 has a disk shape, and includes an injection molded body formed of a synthetic resin material such as PC and ABS. An annular chucking gear 81 is provided at the center of the lower surface of the lower flange 80, and a metal plate 90 is fixed to the inner peripheral side of the chucking gear 81.

The lower flange 80 is provided with an annular support portion 82 supporting the second end surface 62 of the reel hub 60 at the center of the upper surface thereof, and a plurality of second protrusions 84 that engages with the plurality of engagement recessed portions 63 provided on the second end surface 62 is provided on this support portion 82 (see FIG. 11). The second protrusion 84 restricts relative rotation of the lower flange 80 around the axis relative to the reel hub 60 by the engagement action with the engagement recessed portion 63 of the second end surface 62 (see FIG. 12).

On the inner peripheral side of the support portion 82 in the lower flange 80, a plurality of insertion holes 85 through which legs of a reel lock release member (not shown) penetrates, a plurality of gear forming walls 86 including a gear portion that engages with engagement teeth of a reel lock member (not shown) on the upper surface, and a plurality of guide wall portions 87 that guides the center of the above-mentioned reel lock member to the axial center position of the reel hub 60 are provided. A total of three sets are disposed at equal angular intervals on the inner circumferential side of the support portion 82, one set including two gear forming walls 86 and two guide wall portions 87. Note that the gear forming wall 86 of each set corresponds to the gear forming wall 12 in the first embodiment divided into two.

The lower flange 80 further includes a plurality of second engagement portions 83 that engages with the plurality of first engagement portions 73 of the upper flange 70. The second engagement portion 83 is a plate-shaped claw portion that is provided inside the reel hub 60 and projects from the inner peripheral side of the support portion 82 toward the first engagement portion 73. The second engagement portion 83 is disposed between the set of two gear forming walls 86, and three second engagement portion 83 are provided at equal angular intervals on the inner peripheral side of the support portion 82.

The second engagement portion 83 engages with a rectangular an engagement hole 73a provided at the distal end of the first engagement portion 73 from the outer peripheral side of the first engagement portion 73 in a snap-fit method (see FIG. 12 and FIG. 15). As a result, the upper flange 70 and the lower flange 80 are integrally coupled to each other, and the reel hub 60 is sandwiched between the upper flange 70 and the lower flange 80.

In the tape reel 150 according to this embodiment configured as described above, since the reel hub 60 is formed of a member different from not only that of the upper flange 70 but also that of the lower flange 80, a material having a high elastic modulus, such as a metal material, can be easily adopted as a constituent material of the reel hub 60 without considering the moldability of the lower flange 80 or the like. As a result, the selectivity of the constituent material of the reel hub 60 is widened, and the rigidity and characteristics required for the reel hub 60 can be easily satisfied.

Therefore, in accordance with the tape cartridge including the tape reel 150 according to this embodiment, since deformation of the reel hub 60 due to tightening of the magnetic tape and long-term preservation in a high-temperature and high-humidity environment is suppressed, it is possible to suppress the width fluctuation of the magnetic tape, particularly in the EOT region, and to ensure stable recording/reproduction characteristics.

<Details of Magnetic Tape>

As described above, the magnetic tape 22 includes the tape-shaped base material 221 long in the longitudinal direction (X-axis direction), the non-magnetic layer 222 provided on one main surface of the base material 221, the magnetic layer 223 provided on the non-magnetic layer 222, and the back layer 224 provided on the other main surface of the base material 221 (see FIG. 7). Hereinafter, details of the respective portions will be described (reference symbols will be omitted).

[Base Material]

The base material has a long film-like shape. The upper limit value of the average thickness of the base material is favorably 4.2 µm or less, more favorably 3.8 µm or less, and still more favorably 3.4 µm or less. In the case where the upper limit value of the average thickness of the base material is 4.2 µm or less, the recording capacity in one tape cartridge can be made higher than that in a general magnetic recording medium.

The average thickness of the base material is obtained as follows. First, a magnetic recording medium having a ½ inch width is prepared, and cut into a length of 250 mm to prepare a sample. Subsequently, layers other than the base material of the sample (i.e., the non-magnetic layer, the magnetic layer, and the back layer) are removed with a solvent such as MEK (methyl ethyl ketone) and dilute hydrochloric acid. Next, using a laser hologage manufactured by Mitsutoyo as a measuring device, the thickness of the sample (base material) is measured at five or more points, and the measured values are simply averaged (arithmetically averaged) to calculate the average thickness of the base material. Note that the measurement positions are randomly selected from the sample.

The base material contains, for example, at least one of polyesters, polyolefins, cellulose derivatives, vinyl resins, and different polymer resins. In the case where the base material contains two or more of the above-mentioned materials, the two or more materials may be mixed, copolymerized, or laminated.

The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), and CAP (cellulose acetate propionate). The vinyl resins include, for example, at least one of PVC (polyvinyl chloride) or PVDC (polyvinylidene chloride).

The different polymer resin include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyether ester, PES (polyethersulfone), PEI (polyether imide), PSF (polysulfone), PPS (polyphenylene sulfide), PC (polycarbonate), PAR (polyarylate), or PU (polyurethane).

[Magnetic Layer]

A magnetic layer is a recording layer for recording a data signal. The magnetic layer 13 contains a magnetic powder, a binder, conductive particles, and the like. The magnetic layer may further contain an additive such as a lubricant, an abrasive, and a rust inhibitor, as necessary. The magnetic layer has a surface in which a large number of holes are provided. The lubricant is stored in the large number of holes. It is favorable that the large number of holes extend in the direction perpendicular to the surface of magnetic layer.

The degree of perpendicular orientation of the magnetic layer (no demagnetizing field correction: the same applies hereinafter) may be, for example, 65% or more. Further, the degree of longitudinal orientation of the magnetic layer is 35% or less.

The thickness of the magnetic layer is typically 35 nm or more and 90 nm or less. As described above, by setting the thickness of the magnetic layer to 35 nm or more and 90 nm or less, the electromagnetic conversion characteristics can be improved.

The thickness of the magnetic layer can be obtained, for example, in the following manner. First, a test piece is prepared by processing a magnetic recording medium thinly perpendicular to the main surface thereof, and the cross section of the test piece is observed by a transmission electron microscopy (TEM) under the following conditions.

Device: TEM (H9000NAR manufactured by Hitachi, Ltd.)
Acceleration voltage: 300 kV
Magnification: 100,000 times Next, after measuring the thickness of the magnetic layer at least 10 points in the longitudinal direction of the magnetic recording medium using the obtained TEM image, these measured values are simply averaged (arithmetically averaged) to obtain the thickness of the magnetic layer. Note that the measurement positions are randomly selected from the sample piece.

(Magnetic Powder)

The magnetic powder contains a powder of nanoparticles containing ε-iron oxide (hereinafter, referred to as "ε-iron oxide particles"). The ε-iron oxide particles are capable of achieving a high coercive force even if the ε-iron oxide particles are fine particles. It is favorable that the ε-iron oxide contained in the ε-iron oxide particles is preferentially crystallographically oriented in the thickness direction (perpendicular direction) of the magnetic recording medium.

The ε-iron oxide particles have a spherical shape or substantially spherical shape, or a cubic shape or substantially cubic shape. Since the ε-iron oxide particles have the shapes described above, in the case where the ε-iron oxide particles are used as magnetic particles, the area of contact between the particles in the thickness direction of the magnetic recording medium can be reduced, and aggregation of the particles can be suppressed as compared with the case of using hexagonal plate-shaped barium ferrite particles as the magnetic particles. Therefore, it is possible to increase the dispersibility of the magnetic powder and achieve a more favorable SNR (Signal-to-Noise Ratio).

The ε-iron oxide particles have a core-shell structure. Specifically, the ε-iron oxide particles include a core portion, and a shell portion that has a two-layer structure and is provided around the core portion. The shell portion having a two-layer structure includes a first shell portion provided on the core portion, and a second shell portion provided on the first shell portion.

The core portion contains ε-iron oxide. The ε-iron oxide contained in the core portion favorably has ε-$Fe_2O_3$ crystal as the main phase, and has more favorably a single phase of ε-$Fe_2O_3$.

The first shell portion covers at least a part of the periphery of the core portion. Specifically, the first shell portion may partially cover the periphery of the core portion, or may cover the entire periphery of the core portion. From the viewpoint of make exchange coupling of the core portion and the first shell portion sufficient and improving the magnetic properties, the first shell portion favorably covers the entire surface of the core portion 21.

The first shell portion is a so-called soft magnetic layer, and contains, for example, a soft magnetic material such as α-Fe, a Ni—Fe alloy, and a Fe—Si—Al alloy. α-Fe may be obtained by reducing the ε-iron oxide contained in the core portion 21.

The second shell portion is an oxide coating film as an oxidation prevention layer. The second shell portion contains α-iron oxide, aluminum oxide, or silicon oxide. The α-iron oxide includes, for example, at least one iron oxide selected from the group consisting of $Fe_3O_4$, $Fe_2O_3$ and FeO. In the case where the first shell portion contains α-Fe (soft magnetic material), the α-iron oxide may be one obtained by oxidizing α-Fe contained in the first shell portion 22a.

Since the ε-iron oxide particles includes first shell portion as described above, the coercive force Hc of the ε-iron oxide particles (core shell particles) as a whole can be adjusted to a coercive force Hc suitable for recording while keeping the coercive force Hc of the core portion alone at a large value in order to ensure high thermal stability. Further, since the ε-iron oxide particles includes the second shell portion as described above, the ε-iron oxide particles are exposed to air and rust or the like is generated on the surfaces of the particles during and before the process of producing the magnetic recording medium, thereby making it possible to suppress the deterioration of the characteristics of the ε-iron oxide particles. Therefore, it is possible to suppress the characteristic deterioration of the magnetic recording medium.

The average particle size (average maximum particle size) of the magnetic powder is favorably 22 nm or less, more favorably 8 nm or more and 22 nm or less, and still more favorably 12 nm or more and 22 nm or less.

The average aspect ratio of the magnetic powder is favorably 1 or more and 2.5 or less, more favorably 1 or more and 2.1 or less, and still more favorably 1 or more and 1.8 or less. When the aspect ratio of the magnetic powder is within the range of 1 or more and 2.5 or less, aggregation of the magnetic powder can be suppressed, and the resistance applied to the magnetic powder when the magnetic powder is perpendicularly oriented in the process of forming the magnetic layer can be suppressed. Therefore, the perpendicular orientation of the magnetic powder can be improved.

The average volume (particle volume) Vave of the magnetic powder is favorably 2,300 $nm^3$ or less, more favorably 2,200 $nm^3$ or less, more favorably 2,100 $nm^3$ or less, more favorably 1,950 $nm^3$ or less, more favorably 1,600 $nm^3$ or less, and still more favorably 1,300 $nm^3$ or less. When the average volume Vave of the magnetic powder is 2,300 $nm^3$ or less, the peak of the reproduced waveform of the servo signal can be sharpened by narrowing the full width at half maximum of the isolated waveform in the reproduced waveform of the servo signal (to 195 nm or less). Since this improves the accuracy of reading the servo signal, the number of recording tracks can be increased to improve the recording density of data. Note that the smaller the average volume Vave of the magnetic powder, the better. Thus, the lower limit value of the volume is not particularly limited. However, for example, the lower limit value is 1000 $nm^3$ or more.

The average particle size, the average aspect ratio, and the average volume Vave of the above-mentioned magnetic powder are obtained as follows (e.g., in the case where the magnetic powder has a shape such as a spherical shape as in the ε-iron oxide particles). First, the magnetic recording medium to be measured is processed by an FIB (Focused Ion Beam) method or the like to prepare a slice, and the cross section of the slice is observed by TEM. Next, 50 magnetic powders are randomly selected from the obtained TEM photograph, and a major axis length DL and a minor axis length DS of each of the magnetic powder are measured. Here, the major axis length DL means the largest one (so-called maximum Feret diameter) of the distances between two parallel lines drawn from all angles so as to be in contact with the contour of the magnetic powder. Meanwhile, the minor axis length DS means the largest one of the lengths of the magnetic powder in a direction perpendicular to the major axis of the magnetic powder.

Subsequently, the measured major axis lengths DL of the 50 magnetic powders are simply averaged (arithmetically averaged) to obtain an average major axis length DLave. Then, the average major axis length DLave obtained in this manner is used as the average particle size of the magnetic powder. Further, the measured minor axis lengths DS of the 50 magnetic powders are simply averaged (arithmetically averaged) to obtain an average minor axis length DSave. Next, an average aspect ratio (DLave/DSave) of the magnetic powder is obtained on the basis of the average major axis length DLave and the average minor axis length DSave.

Next, an average volume (particle volume) Vave of the magnetic powder is obtained from the following formula by using the average major axis length DLave.

$$Vave = \pi/6 \times DLave^3$$

In this description, the case where the ε-iron oxide particles include a shell portion having a two-layer structure has been described. However, the ε-iron oxide particles may include a shell portion having a single-layer structure. In this case, the shell portion has a configuration similar to that of the first shell portion. However, from the viewpoint of suppressing the characteristic deterioration of the ε-iron oxide particles, it is favorable that the ε-iron oxide particles include a shell portion having a two-layer structure as described above.

In the above description, the case where the ε-iron oxide particles have a core-shell structure has been described. However, the ε-iron oxide particles may contain an additive instead of the core-shell structure, or may contain an additive while having a core-shell structure. In this case, some Fe of the ε-iron oxide particles are substituted by the additives. Also by causing the ε-iron oxide particles to contain an additive, the coercive force Hc of the ε-iron oxide particles as a whole can be adjusted to a coercive force Hc suitable for recording, and thus, the ease of recording can be improved. The additive is a metal element other than iron, favorably, a trivalent metal element, more favorably at least one of Al, Ga, or In, and still more favorably at least one of Al or Ga.

Specifically, the ε-iron oxide containing the additive is ε-$Fe_{2-x}M_xO_3$ crystal (However, M represents a metal element other than iron, favorably a trivalent metal element, more favorably at least one of Al, Ga or In, and still more favorably at least one of Al or Ga. x satisfies the following formula represented by: $0<x<1$, for example.).

The magnetic powder may contain a powder of nanoparticles (hereinafter, referred to as "hexagonal ferrite particles".) containing hexagonal ferrite. The hexagonal ferrite particles have, for example, a hexagonal plate shape or a substantially hexagonal plate shape. The hexagonal ferrite favorably contains at least one of Ba, Sr, Pb, or Ca, more favorably at least one of Ba or Sr. The hexagonal ferrite may specifically be, for example, barium ferrite or strontium ferrite. Barium ferrite may further contain at least one of Sr, Pb, or Ca, in addition to Ba. Strontium ferrite may further contain at least one of Ba, Pb, or Ca, in addition to Sr.

More specifically, the hexagonal ferrite has an average composition represented by the following general formula represented by: $MFe_{12}O_{19}$. However, M represents, for example, at least one metal selected from the group consisting of Ba, Sr, Pb, and Ca, favorably at least one metal selected from the group consisting of Ba and Sr. M may represent a combination of Ba and one or more metals selected from the group consisting of Sr, Pb, and Ca. Further, M may represent a combination of Sr and one or more metals selected from the group consisting of Ba, Pb, and Ca. In the above-mentioned general formula, some Fe may be substituted by other meatal elements.

In the case where the magnetic powder contains a powder of hexagonal ferrite particles, the average particle size of the magnetic powder is favorably 50 nm or less, more favorably 10 nm or more and 40 nm or less, and still more favorably 15 nm or more and 30 nm or less. In the case where the magnetic powder contains a powder of hexagonal ferrite particles, the average aspect ratio of the magnetic powder and the average volume Vave of the magnetic powder are as described above.

Note that the average particle size, the average aspect ratio, and the average volume Vave of the magnetic powder are obtained as follows (e.g., in the case where the magnetic powder has a plate-like shape as in hexagonal ferrite). First, the magnetic recording medium to be measured is processed by an FIB method or the like to prepare a slice, and the cross section of the slice is observed by TEM. Next, 50 magnetic powders oriented at an angle of 75 degrees or more with respect to the horizontal direction are randomly selected from the obtained TEM photograph, and a maximum plate thickness DA of each magnetic powder is measured. Subsequently, the measured maximum plate thicknesses DA of the 50 magnetic powders are simply averaged (arithmetically averaged) to obtain an average maximum plate thickness DAave.

Next, the surface of the magnetic layer of the magnetic recording medium is observed by TEM. Next, 50 magnetic powders are randomly selected from the obtained TEM photograph, and a maximum plate diameter DB of each magnetic powder is measured. Here, the maximum plate diameter DB means the largest one (so-called maximum Feret diameter) of the distances between two parallel lines drawn from all angles so as to be in contact with the contour of the magnetic powder. Subsequently, the measured maximum plate diameters DB of the 50 magnetic powders are simply averaged (arithmetically averaged) to obtain an average maximum plate diameter DBave. Then, the average maximum plate diameter DBave obtained in this manner is used as the average particle size of the magnetic powder. Next, an average aspect ratio (DBave/DAave) of the magnetic powder is obtained on the basis of the average maximum plate thickness DAave and the average maximum plate diameter DBave.

Next, using the average maximum plate thickness DAave and the average maximum plate diameter DBave, an average volume (particle volume) Vave of the magnetic powder is obtained from the following formula.

$$V\text{ave}=3\sqrt{3/8}\times DA\text{ave}\times DB\text{ave}^2$$

The magnetic powder may contain a powder of nanoparticles (hereinafter, referred to as "cobalt ferrite particles".) containing Co-containing spinel ferrite. The cobalt ferrite particles favorably have uniaxial anisotropy. The cobalt ferrite particles have, for example, a cubic shape or a substantially cubic shape. The Co-containing spinel ferrite may further contain at least one of Ni, Mn, Al, Cu, or Zn, in addition to Co.

The Co-containing spinel ferrite has, for example, the average composition represented by the following formula (1).

$$Co_xM_yFe_2O_z \quad (1)$$

(However, in the formula (1), M represents, for example, at least one metal selected from the group consisting of Ni, Mn, Al, Cu, and Zn. X represents a value within the range of $0.4 \leq x \leq 1.0$. y represents a value within the range of $0 \leq y \leq 0.3$. However, x and y satisfies the relationship of $(x+y) \leq 1.0$. z represents a value within the range of $3 \leq z \leq 4$. Some Fe may be substituted by other metal elements.)

In the case where the magnetic powder contains a powder of cobalt ferrite particles, the average particle size of the magnetic powder is favorably 25 nm or less, more favorably 23 nm or less. In the case where the magnetic powder contains a powder of cobalt ferrite particles, the average aspect ratio of the magnetic powder is determined by the method described above, and the average volume Vave of the magnetic powder is determined by the method shown below.

Note that in the case where the magnetic powder has a cubic shape as in cobalt ferrite particles, the average volume (particle volume) Vave of the magnetic powder can be obtained as follows. First, the surface of the magnetic layer of the magnetic recording medium is observed by TEM. Then, 50 magnetic powders are randomly selected from the obtained TEM photograph, and a side length DC of each of the magnetic powders is measured. Subsequently, the measured side lengths DC of the 50 magnetic powders are simply averaged (arithmetically averaged) to obtain an average side length DCave. Next, using the average side length DCave, the average volume (particle volume) Vave of the magnetic powder is obtained from the following formula.

$$V\text{ave}=DC\text{ave}^3$$

(Binder)

As the binder, a resin having a structure in which a crosslinking reaction is imparted to a polyurethane resin, a vinyl chloride resin, or the like is favorable. However, the binder is not limited thereto, and another resin may be appropriately mixed depending on the physical properties required for the magnetic recording medium. The resin to be mixed is not particularly limited as long as it is a resin generally used in the coating-type magnetic recording medium.

Examples of the resin include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, a vinyl chloride-acrylonitrile copolymer, an acrylic ester-acrylonitrile copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, and synthetic rubber.

Further, examples of the thermosetting resin or the reactive resin include a phenol resin, an epoxy resin, a urea resin, a melamine resin, an alkyd resin, a silicone resin, a polyamine resin, and a urea formaldehyde resin.

Further, a polar functional group such as $-SO_3M$, $-OSO_3M$, $-COOM$, and $P=O(OM)_2$ may be introduced into the above-mentioned binders for the purpose of improving dispersibility of the magnetic powder. Here, M in the formula represents a hydrogen atom, or an alkali metal such as lithium, potassium, and sodium.

Further, examples of the polar functional groups include those of the side chain type having the terminal group of —NR1R2 or —NR1R2R3$^+$X$^-$ and those of the main chain type having >NR1R2$^+$X$^-$. Here, R1, R2, and R3 in the formula each represent a hydrogen atom or a hydrocarbon group, and X$^-$ represents a halogen element ion such as fluorine, chlorine, bromine, and iodine, or an inorganic or organic ion. Further, examples of the polar functional groups include also —OH, —SH, —CN, and an epoxy group.

(Lubricant)

It is favorable that the lubricant contains a compound represented by the following general formula (1) and a compound represented by the following general formula (2). In the case where the lubricant contains these compounds, it is possible to particularly reduce the dynamic friction coefficient of the surface of the magnetic layer. Therefore, it is possible to further improve the traveling property of the magnetic recording medium.

$$CH_3(CH_2)_nCOOH \qquad (1)$$

(However, in the general formula (1), n represents an integer selected from the range of 14 or more and 22 or less.)

$$CH_3(CH_2)_pCOO(CH_2)_qCH_3 \qquad (2)$$

(However, in the general formula (2), p represents an integer selected from the range of 14 or more and 22 or less, and q represents an integer selected from the range of 2 or more and 5 or less.)

(Additive)

The magnetic layer may further contain, as non-magnetic reinforcing particles, aluminum oxide (α, β, or γ-alumina), chromium oxide, silicon oxide, diamond, garnet, emery, boron nitride, titanium carbide, silicon carbide, titanium carbide, titanium oxide (rutile or anatase-type titanium oxide), or the like.

[Non-Magnetic Layer]

The non-magnetic layer contains a non-magnetic powder and a binder. The non-magnetic layer may contain an additive such as conductive particles, a lubricant, a curing agent, and a rust prevention material as necessary.

The thickness of the non-magnetic layer is favorably 0.6 μm or more and 2.0 μm or less, more favorably 0.8 μm or more and 1.4 μm or less. The thickness of the non-magnetic layer can be obtained by a method similar to the method of obtaining the thickness of the magnetic layer (e.g., TEM). Note that the magnification of the TEM image is appropriately adjusted depending on the thickness of the non-magnetic layer.

(Non-Magnetic Powder)

The non-magnetic powder includes, for example, at least one of an inorganic particle powder or an organic particle powder. Further, the non-magnetic powder may contain a carbon material such as carbon black. Note that one type of non-magnetic powder may be used alone, or two or more types of non-magnetic powders may be used in combination. The inorganic particles include, for example, a metal, a metal oxide, a metal carbonate, a metal sulfate, a metal nitride, a metal carbide, or a metal sulfide. Examples of the shape of the non-magnetic powder include, but not limited to, various shapes such as a needle shape, a spherical shape, a cubic shape, and a plate shape.

(Binder)

The binder is similar to that in the above-mentioned magnetic layer.

[Back Layer]

The back layer contains a non-magnetic layer and a binder. The back layer may contain an additive such as a lubricant, a curing agent, and an antistatic agent, as necessary. As the non-magnetic powder and the binder, materials similar to those used in the above-mentioned non-magnetic layer are used.

(Non-Magnetic Powder)

The average particle size of the non-magnetic powder is favorably 10 nm or more and 150 nm or less, more favorably 15 nm or more and 110 nm or less. The average particle size of the magnetic powder is obtained in a way similar to that for the average particle size D of the above-mentioned magnetic powder. The non-magnetic powder may include a non-magnetic powder having two or more particle size distributions.

The upper limit value of the average thickness of the back layer is favorably 0.6 μm or less. When the upper limit value of the average thickness of the back layer is 0.6 μm or less, since the thicknesses of the non-magnetic layer and the base material can be kept thick even in the case where the average thickness of the magnetic recording medium is 5.6 μm, it is possible to maintain the traveling stability of the magnetic recording medium in the recording/reproduction device. The lower limit value of the average thickness of the back layer is not particularly limited, but is, for example, 0.2 μm or more.

The average thickness of the back layer is obtained as follows. First, a magnetic recording medium having a ½ inch width is prepared and cut into a length of 250 mm, to prepare a sample. Next, using a laser hologage manufactured by Mitsutoyo as a measuring device, the thickness of the sample is measured at five or more points, and these measured values are simply averaged (arithmetically averaged) to calculate an average value $t_T$ [μm] of the magnetic recording medium. Note that the measurement positions are randomly selected from the sample. Subsequently, the back layer of the sample is removed with a solvent such as MEK (methyl ethyl ketone) and dilute hydrochloric acid. After that, the thickness of the sample is measured at five or more points by using the above-mentioned laser hologage again, and these measured values are simply averaged (arithmetically averaged) to calculate an average value $t_B$ [μm] of the magnetic recording medium from which the back layer has been removed. Note that the measurement positions are randomly selected from the sample. After that, an average thickness $t_b$ [μm] of the back layer is obtained from the following formula.

$$t_b[\mu m] = t_T[\mu m] - t_B[\mu m]$$

The back layer has a surface in which a large number of projecting portions are provided. The large number of projecting portions are for forming a large number of holes on the surface of the magnetic layer when the magnetic recording medium is wound in a roll. The large number of holes include, for example, a large number of non-magnetic particles projecting from the surface of the back layer.

In this description, the case where a large number of projecting portions provided on the surface of the back layer are transferred to the surface of magnetic layer to form a large number of holes on the surface of the magnetic layer has been described, but the method of forming a large number of holes is not limited thereto. For example, a large number of holes may be formed on the surface of the magnetic layer by adjusting the type of the solvent contained in the coating material for forming a magnetic layer, the drying condition of the coating material for forming a magnetic layer, and the like.

[Average Thickness of Magnetic Recording Medium]

The upper limit value of the average thickness (average total thickness) of the magnetic recording medium is favorably 5.6 µm or less, more favorably 5.0 µm or less, more favorably 4.6 µm or less, and still more favorably 4.4 µm or less. When the average thickness of the magnetic recording medium is 5.6 µm or less, the recording capacity in a cartridge can be made higher than that in a general magnetic recording medium. The lower limit value of the average thickness of the magnetic recording medium is not particularly limited, but is, for example, 3.5 µm or more.

The average thickness of the magnetic recording medium is obtained by the procedure described in the above-mentioned method of obtaining the average thickness of the back layer.

Modified Example

For example, although the tape reel including the upper flange and the lower flange has been described as an example in the embodiment described above, the present technology is also applicable to a tape reel having a single reel hub configuration that does not include them.

Further, although the magnetic tape cartridge incorporating the tape reel on which the magnetic tape is wound has been described in the embodiment described above, the present technology is also applicable to a tape reel on which a cleaning tape is wound and a cleaning tape cartridge incorporating this tape reel.

Further, although the tape cartridge conforming to the LTO standard has been described in the embodiment described above, the present technology is not limited thereto, and is also applicable to a tape reel in a tape cartridge of another standard similarly.

It should be noted that the present technology may take the following configurations.

(1) A tape reel, including:
  a cylindrical reel hub that includes an outer periphery portion, a tape being wound on the reel hub, in which
  the reel hub is formed of a material in which a deformation amount when a load of 300 N is applied radially inward to an axial center of the outer periphery portion is 0.3 mm or less and a water absorption rate is 0.1% or less.
(2) The tape reel according to (1) above, in which
  the reel hub is formed of a material having a flexural modulus of 15 GPa or more.
(3) The tape reel according to (1) or (2) above, in which
  the reel hub is a molded body of a composite material in which an inorganic filler is contained in a PPS resin
(4) The tape reel according to (3), in which
  the inorganic filler is at least one of a glass filler, a mineral filler, or a carbon filler.
(5) The tape reel according to any one of (1) to (5) above, further including:
  a first flange bonded to one axial end of the reel hub; and
  a second flange integrally molded in the other axial end of the reel hub.
(6) The tape reel according to (1), (2), or (5) above, in which
  the reel hub is formed of stainless steel.
(7) A tape reel, including:
  a first flange;
  a second flange; and
  a cylindrical reel hub that is disposed between the first flange and the second flange and has an elastic modulus higher than those of the first flange and the second flange.
(8) The tape reel according to (7) above, in which
  the first flange includes a plurality of first engagement portions provided inside the reel hub,
  the second flange includes a plurality of second engagement portions that is disposed inside the reel hub and engages with the plurality of first engagement portions, and
  the reel hub is sandwiched between the first flange and the second flange coupled to each other via the plurality of first engagement portions and the plurality of second engagement portions.
(9) The tape reel according to (8) above, in which
  the first flange further includes a plurality of first protrusions that fits into one axial end surface of the reel hub.
(10) The tape reel according to (9) above, in which
  the second flange further includes a plurality of second protrusions that fits into the other axial end surface of the reel hub.
(11) A tape cartridge, including:
  a tape reel including a cylindrical reel hub that includes an outer periphery portion, a tape being wound on the reel tape, in which
  the reel hub is formed of a material in which a deformation amount when a load of 300 N is applied radially inward to an axial center of the outer periphery portion is 0.3 mm or less and a water absorption rate is 0.1% or less.
(12) The tape cartridge according to (11) above, further including
  a magnetic tape wound on the outer periphery portion of the reel hub, in which
  an average thickness of the magnetic tape is 5.6 µm or less.
(13) The tape cartridge according to (12) above, in which
  the average thickness of the magnetic tape is 5.0 µm or less.
(14) The tape cartridge according to (13) above, in which
  the average thickness of the magnetic tape is 4.6 µm or less.
(15) A tape cartridge, including:
  a tape reel that includes
    a first flange,
    a second flange, and
    a cylindrical reel hub that is disposed between the first flange and the second flange and has an elastic modulus higher than those of the first flange and the second flange, a tape being wound on the reel hub.
(16) The tape cartridge according to (15) above, further including
  a magnetic tape wound on the outer periphery portion of the reel hub, in which
  an average thickness of the magnetic tape is 5.6 µm or less.
(17) The tape cartridge according to (16) above, in which
  the average thickness of the magnetic tape is 5.0 µm or less.
(18) The tape cartridge according to (17) above, in which
  the average thickness of the magnetic tape is 4.6 µm or less.

REFERENCE SIGNS LIST 1 tape cartridge
5, 150 tape reel
6, 60 reel hub
7, 70 upper flange
8, 80 lower flange 22 magnetic tape
63 engagement recessed portion
73 first engagement portion
74 first protrusion
83 second engagement portion
84 second protrusion

The invention claimed is:

1. A tape reel, comprising:
a cylindrical reel hub that includes an outer periphery portion, a tape being wound on the reel hub, wherein
the reel hub is a molded body of a composite material in which an inorganic filler is contained in a polyphenylene sulfide resin and in which a deformation amount when a load of 300 N is applied radially inward to an axial center of the outer periphery portion is 0.165 mm to 0.3 mm and a water absorption rate is 0.1% or less,
wherein the composite material having a flexural modulus of 20 GPa or more,
wherein the inorganic filler is at least one of a glass filler, a mineral filler, or a carbon filler, and
wherein an amount of the inorganic filler ranges from 30 wt % to 65 wt %.

2. The tape reel according to claim 1, further comprising:
a first flange bonded to one axial end of the reel hub; and
a second flange integrally molded in the other axial end of the reel hub.

3. The tape reel according to claim 1, wherein the flexural modulus is 20 GPa to 31 GPa.

4. The tape reel according to claim 1, wherein the flexural modulus is 20 GPa to less than 31 GPa.

5. A tape reel, comprising:
a first flange;
a second flange; and
a cylindrical reel hub that is disposed between the first flange and the second flange and has an elastic modulus higher than those of the first flange and the second flange,
wherein the cylindrical reel hub is a molded body of a composite material in which an inorganic filler is contained in a polyphenylene sulfide resin and in which a deformation amount when a load of 300 N is applied radially inward to an axial center of the outer periphery portion is 0.165 mm to 0.3 mm and a water absorption rate is 0.1% or less,
wherein the composite material having a flexural modulus of 20 GPa or more,
wherein the inorganic filler is at least one of a glass filler, a mineral filler, or a carbon filler, and
wherein an amount of the inorganic filler ranges from 30 wt % to 65 wt %.

6. The tape reel according to claim 5, wherein
the first flange includes a plurality of first engagement portions provided inside the reel hub,
the second flange includes a plurality of second engagement portions that is disposed inside the reel hub and engages with the plurality of first engagement portions, and
the cylindrical reel hub is sandwiched between the first flange and the second flange coupled to each other via the plurality of first engagement portions and the plurality of second engagement portions.

7. The tape reel according to claim 6, wherein
the first flange further includes a plurality of first protrusions that fits into one axial end surface of the reel hub.

8. The tape reel according to claim 7, wherein
the second flange further includes a plurality of second protrusions that fits into the other axial end surface of the reel hub.

9. A tape cartridge, comprising:
a tape reel including a cylindrical reel hub that includes an outer periphery portion, a tape being wound on the reel tape, wherein
the cylindrical reel hub is a molded body of a composite material in which an inorganic filler is contained in a polyphenylene sulfide resin and in which a deformation amount when a load of 300 N is applied radially inward to an axial center of the outer periphery portion is 0.165 mm to 0.3 mm and a water absorption rate is 0.1% or less,
wherein the composite material having a flexural modulus of 20 GPa or more,
wherein the inorganic filler is at least one of a glass filler, a mineral filler, or a carbon filler, and
wherein an amount of the inorganic filler ranges from 30 wt % to 65 wt %.

10. The tape cartridge according to claim 9, further comprising
a magnetic tape wound on the outer periphery portion of the reel hub, wherein
an average thickness of the magnetic tape is 5.6 µm or less.

11. The tape cartridge according to claim 10, wherein
the average thickness of the magnetic tape is 5.0 µm or less.

12. The tape cartridge according to claim 11, wherein
the average thickness of the magnetic tape is 4.6 µm or less.

13. A tape cartridge, comprising:
a tape reel that includes
a first flange,
a second flange, and
a cylindrical reel hub that is disposed between the first flange and the second flange and has an elastic modulus higher than those of the first flange and the second flange, a tape being wound on the reel hub,
wherein the cylindrical reel hub is a molded body of a composite material in which an inorganic filler is contained in a polyphenylene sulfide resin and in which a deformation amount when a load of 300 N is applied radially inward to an axial center of the outer periphery portion is 0.165 mm to 0.3 mm and a water absorption rate is 0.1% or less,
wherein the composite material having a flexural modulus of 20 GPa or more,
wherein the inorganic filler is at least one of a glass filler, a mineral filler, or a carbon filler, and
wherein an amount of the inorganic filler ranges from 30 wt % to 65 wt %.

14. The tape cartridge according to claim 13, further comprising
a magnetic tape wound on the outer periphery portion of the reel hub, wherein
an average thickness of the magnetic tape is 5.6 µm or less.

15. The tape cartridge according to claim 14, wherein
the average thickness of the magnetic tape is 5.0 µm or less.

16. The tape cartridge according to claim 15, wherein
the average thickness of the magnetic tape is 4.6 µm or less.

* * * * *